United States Patent
Seo et al.

(10) Patent No.: US 10,404,351 B2
(45) Date of Patent: Sep. 3, 2019

(54) LAYERED DIVISION MULTIPLEXING-BASED BROADCAST RELAY APPARATUS AND METHOD

(71) Applicant: ELECTRONICS AND TELECOMMUNICATIONS RESEARCH INSTITUTE, Daejeon (KR)

(72) Inventors: Jae-Hyun Seo, Daejeon (KR); Young-Min Kim, Daejeon (KR); Heung-Mook Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 154 days.

(21) Appl. No.: 15/447,579

(22) Filed: Mar. 2, 2017

(65) Prior Publication Data
US 2017/0324498 A1    Nov. 9, 2017

(30) Foreign Application Priority Data

May 9, 2016    (KR) .................. 10-2016-0056235

(51) Int. Cl.
*H04B 7/14*    (2006.01)
*H04B 7/155*   (2006.01)
(Continued)

(52) U.S. Cl.
CPC .......... *H04B 7/14* (2013.01); *H04B 7/15528* (2013.01); *H04H 20/02* (2013.01); *H04H 20/42* (2013.01);
(Continued)

(58) Field of Classification Search
CPC ........ H04B 7/00; H04B 7/15528; H04B 7/14; H04J 11/004; H04J 15/00; H04H 20/42;
(Continued)

(56) References Cited

U.S. PATENT DOCUMENTS

2008/0298295 A1    12/2008  Park et al.
2009/0129450 A1    5/2009   Eum et al.
(Continued)

FOREIGN PATENT DOCUMENTS

CA            2958252 A1 *  3/2016  ............. H04L 27/26
KR    10-2011-0037821        4/2011

OTHER PUBLICATIONS

Angueira,"Layered Division Multiplexing: Basics Concepts, Application Scenarios and Performance", 2015, SMPTE, SMPTE Sydney 2015 Technical Conference & Exibition (Year: 2015).*

(Continued)

*Primary Examiner* — Paul H Masur
*Assistant Examiner* — Michael K Phillips
(74) *Attorney, Agent, or Firm* — Staas & Halsey LLP

(57) ABSTRACT

Disclosed herein are a Layered Division Multiplexing (LDM)-based broadcast relay apparatus and method. The LDM-based broadcast relay apparatus includes a first layer symbol generation unit for outputting a first layer broadcast signal based on a received Layered Division Multiplexed (LDM) broadcast signal, a data buffer unit for storing the received LDM broadcast signal for a delay time before the first layer broadcast signal is output, and a second layer symbol generation unit for outputting a second layer broadcast signal by eliminating the first layer broadcast signal from the stored broadcast signal.

8 Claims, 6 Drawing Sheets

(51) Int. Cl.
  *H04J 11/00* (2006.01)
  *H04L 27/34* (2006.01)
  *H04H 20/02* (2008.01)
  *H04H 20/42* (2008.01)
  *H04B 7/00* (2006.01)
  *H04J 99/00* (2009.01)

(52) U.S. Cl.
  CPC ........ *H04J 11/004* (2013.01); *H04L 27/3488* (2013.01); *H04B 7/00* (2013.01); *H04J 15/00* (2013.01)

(58) Field of Classification Search
  CPC ... H04H 20/02; H04L 27/3488; H04L 1/0071; H04W 52/346; H04W 4/06; H04W 52/04
  See application file for complete search history.

(56) References Cited

U.S. PATENT DOCUMENTS

| | | | |
|---|---|---|---|
| 2012/0185909 A1 | 7/2012 | Seo et al. | |
| 2013/0107791 A1* | 5/2013 | Oh | H04B 7/0452 370/312 |
| 2016/0218823 A1* | 7/2016 | Baek | H04L 1/0041 |
| 2016/0277150 A1* | 9/2016 | Baek | H03M 13/2792 |
| 2019/0028228 A1* | 1/2019 | Kimura | H04J 7/02 |

OTHER PUBLICATIONS

Jae-Young Lee et al., "Performance Evaluation of Lower Layer System in Cloud Transmission for Terrestrial DTV Broadcasting," Broadband Multimedia Systems and Broadcasting (BMSB), 2014.
Yiyan Wu et al., "Cloud Transmission: A New Spectrum-Reuse Friendly Digital Terrestrial Broadcasting Transmission System," IEEE Transactions on Broadcasting, 2012.

* cited by examiner

LAYERED DIVISION MULTIPLEXING-BASED BROADCAST RELAY APPARATUS AND METHOD

CROSS REFERENCE TO RELATED APPLICATION

This application claims the benefit of Korean Patent Application No. 10-2016-0056235, filed May 9, 2016, which is hereby incorporated by reference in its entirety into this application.

BACKGROUND OF THE INVENTION

1. Technical Field

The present invention generally relates to a next-generation broadcast system and, more particularly, to broadcast relay technology to which Layered Division Multiplexing (LDM) is applied.

2. Description of the Related Art

Advanced Television Systems Committee (ATSC) 3.0, which is a next-generation broadcast system, includes requirements stipulating that a fixed Ultra High Definition (UHD) service and a mobile HD service must be simultaneously provided through a single channel. In particular, in order for transmitted streams that provide different services through a single channel, a multiplexing technique is required. Unlike European Digital Video Broadcasting-Second Generation Terrestrial (DVB-T2), which provides a Time Division Multiplexing (TDM) technique, and Japanese Integrated Services Digital Broadcasting-Terrestrial (ISDB-T), which provides a Frequency Division Multiplexing (FDM) technique, ATSC 3.0 utilizes a Layered Division Multiplexing (LDM) technique having spectral efficiency higher than that of TDM and FDM. TDM and FDM are disadvantageous in that only part of time or an RF channel is used, and thus transmission capacity is limited, but LDM is advantageous in that it uses 100% of time and 100% of an RF channel, and thus performance may be maximized from the standpoint of transmission capacity.

This LDM technique may provide physical scalability in various broadcast environments by applying different channel code rates and modulation orders to multiple streams when the multiple streams are transmitted through a single broadcast channel based on multi-layer transmission.

Meanwhile, Korean Patent Application Publication No. 10-2011-0037821 entitled "Apparatus of Repeating for Terrestrial DTV Broadcasting Signal and Additional Data Transmission and Method thereof" discloses technology in which an encoding/decoding unit including a separate additional data extraction unit or the like is added between a demodulation unit and a modulation unit, and thus high-quality output signals are provided by the repeating apparatus.

SUMMARY OF THE INVENTION

Accordingly, the present invention has been made keeping in mind the above problems occurring in the prior art, and an object of the present invention is to independently separate a Layered Division Multiplexed (LDM) broadcast signal into respective layers and relay the separated broadcast signals.

Another object of the present invention is to regenerate LDM broadcast signals, which are separated into respective layers, in the form of symbols through channel decoding and channel encoding, thus improving the quality of output signals.

A further object of the present invention is to provide the structure of a simplified relay by relaying an LDM broadcast signal in a single layer that is independently separated.

In accordance with an aspect of the present invention to accomplish the above objects, there is provided a Layered Division Multiplexing (LDM)-based broadcast relay apparatus, including a first layer symbol generation unit for outputting a first layer broadcast signal based on a received Layered Division Multiplexed (LDM) broadcast signal; a data buffer unit for storing the received LDM broadcast signal for a delay time before the first layer broadcast signal is output; and a second layer symbol generation unit for outputting a second layer broadcast signal by eliminating the first layer broadcast signal from the stored broadcast signal.

Each of the first layer broadcast signal and the second layer broadcast signal may have a form of a symbol unit.

The first layer broadcast signal and the second layer broadcast signal may be output after different power values have been injected into the first layer broadcast signal and the second layer broadcast signal.

The second layer symbol generation unit may be configured to eliminate the first layer broadcast signal from the stored broadcast signal based on symbol synchronization of the first layer broadcast signal.

The LDM-based broadcast relay apparatus may further include a power normalization unit for normalizing the different power values so as to combine the first layer broadcast signal with the second layer broadcast signal.

The power normalization unit may determine power injection levels based on the received LDM broadcast signal so as to normalize the different power values.

In accordance with another aspect of the present invention to accomplish the above objects, there is provided a Layered Division Multiplexing (LDM)-based broadcast relay method using an LDM-based broadcast relay apparatus, the method including outputting a first layer broadcast signal based on a received Layered Division Multiplexed (LDM) broadcast signal; storing the received LDM broadcast signal for a delay time before the first layer broadcast signal is output; and outputting a second layer broadcast signal by eliminating the first layer broadcast signal from the stored broadcast signal.

Each of the first layer broadcast signal and the second layer broadcast signal may have a form of a symbol unit.

The first layer broadcast signal and the second layer broadcast signal may be output after different power values have been injected into the first layer broadcast signal and the second layer broadcast signal, respectively.

Outputting the second layer broadcast signal may be configured to eliminate the first layer broadcast signal from the stored broadcast signal based on symbol synchronization of the first layer broadcast signal.

The LDM-based broadcast relay method may further include, after outputting the second layer broadcast signal, normalizing the different power values so as to combine the first layer broadcast signal with the second layer broadcast signal.

Normalizing the different power values may be configured to determine power injection levels based on the received LDM broadcast signal so as to normalize the different power values.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
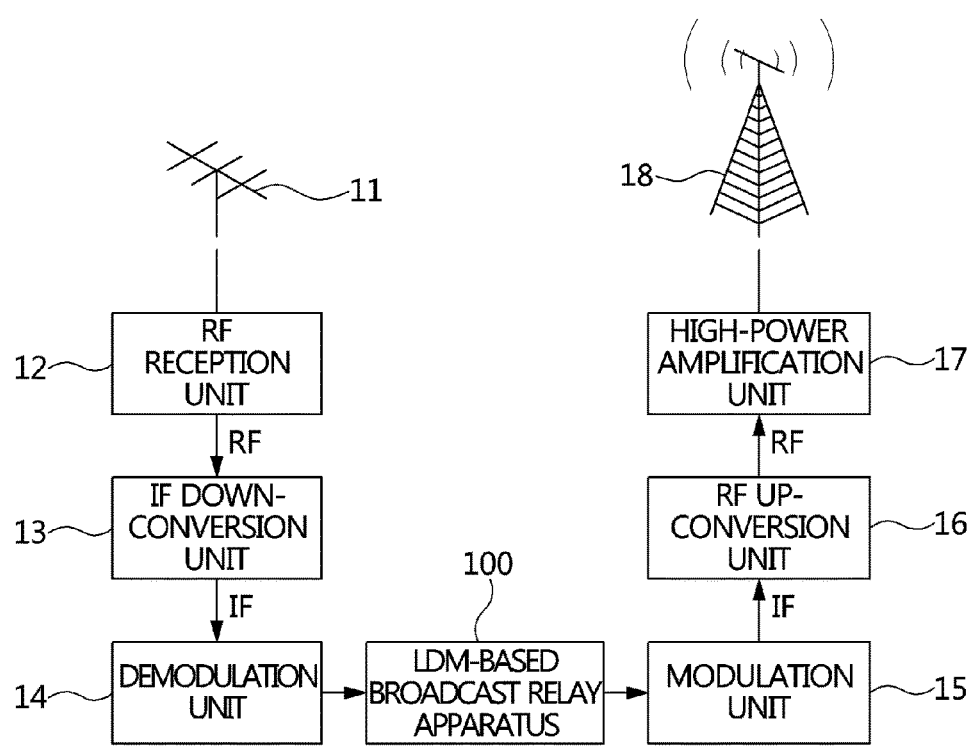
FIG. 1 is a block diagram showing a Layered Division Multiplexing (LDM)-based broadcast relay station according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing a Layered Division Multiplexing (LDM)-based broadcast relay station according to an embodiment of the present invention.

Referring to FIG. 1, the LDM-based broadcast relay station according to the embodiment of the present invention includes a receiving antenna 11, a Radio Frequency (RF) reception unit 12, an Intermediate Frequency (IF) down-conversion unit 13, a demodulation unit 14, a modulation unit 15, an RF up-conversion unit 16, a high-power amplification unit 17, a transmitting antenna 18, and an LDM-based broadcast relay apparatus 100.

The receiving antenna 11 and the RF reception unit 12 may select the channel of an RF signal transmitted from a main transmitter and may receive the RF signal through the selected channel.

The IF down-conversion unit 13 may convert the received RF signal into an IF signal.

The demodulation unit 14 may demodulate the IF signal into a baseband signal.

The LDM-based broadcast relay apparatus 100 may generate and output an LDM broadcast relay signal based on LDM.

The modulation unit 15 may convert the LDM broadcast relay signal into an IF signal. Here, the LDM broadcast relay signal may be a signal obtained by injecting different power values into a first layer broadcast signal and a second layer broadcast signal, independently separating the power-injected first and second layer broadcast relay signals, and combining the separated signals.

The RF up-conversion unit 16 may convert the IF signal into an RF signal.

The high-power amplification unit 17 may amplify the RF signal.

The transmitting antenna 18 may transmit the amplified RF signal to a receiver.

Figure 2:
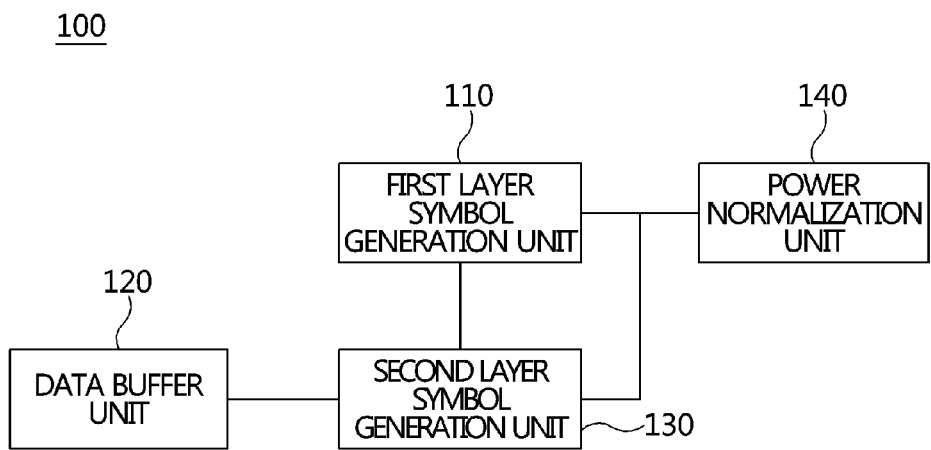
FIG. 2 is a block diagram showing an LDM-based broadcast relay apparatus according to an embodiment of the present invention.

FIG. 2 is a block diagram showing an LDM-based broadcast relay apparatus according to an embodiment of the present invention.

Referring to FIG. 2, the LDM-based broadcast relay apparatus according to the embodiment of the present invention includes a first layer symbol generation unit 110, a data buffer unit 120, a second layer symbol generation unit 130, and a power normalization unit 140.

Here, a received LDM broadcast signal, which will be described below, may be an LDM broadcast signal that is output by applying a channel decoding procedure through a first layer channel decoding unit 101 (see FIG. 3) and a channel encoding procedure through a first layer channel encoding unit 102 (see FIG. 3) to the baseband signal demodulated by the demodulation unit 14.

Alternatively, the received LDM broadcast signal, which will be described below may be an LDM broadcast signal demodulated into the baseband signal by the demodulation unit 14.

The first layer symbol generation unit 110 may output a first layer broadcast signal based on the received LDM broadcast signal.

Here, the first layer symbol generation unit 110 may generate and output a first layer symbol based on the signal obtained by independently applying channel decoding and channel encoding only to the first layer of the received LDM broadcast signal.

The first layer broadcast signal may have the form of a symbol unit.

The data buffer unit 120 may store the received LDM broadcast signal for a delay time before the first layer broadcast signal is output.

The second layer symbol generation unit 130 may output a second layer broadcast signal by eliminating the first layer broadcast signal from the stored LDM broadcast signal. Here, the second layer symbol generation unit 130 may eliminate the first layer broadcast signal from the stored LDM broadcast signal based on symbol synchronization of the first layer broadcast signal.

In this case, the second layer symbol generation unit 130 may generate and output a second layer symbol based on a signal obtained by independently applying channel decoding and channel encoding only to the second layer of the received LDM broadcast signal.

The second layer broadcast signal may have the form of a symbol unit.

In this case, different power values may be injected into the first layer broadcast signal and the second layer broadcast signal, and then power-injected first and second layer broadcast signals may be output.

The power normalization unit 140 may normalize different power values so as to combine the first layer broadcast signal with the second layer broadcast signal.

In this case, the power normalization unit 140 may determine power injection levels based on the received LDM broadcast signal in order to normalize different power values.

In this regard, the power normalization unit 140 may output an LDM broadcast relay signal by normalizing the different power values. The LDM broadcast relay signal may be a signal obtained by injecting different power values into the first layer broadcast signal and the second layer broadcast signal, independently separating the power-injected first and second layer broadcast signals, and combining the power-injected first and second layer broadcast signals.

Therefore, the LDM broadcast relay signal may provide quality equal to or better than that of a broadcast relay signal output from a conventional broadcast relay apparatus.

Figure 3:
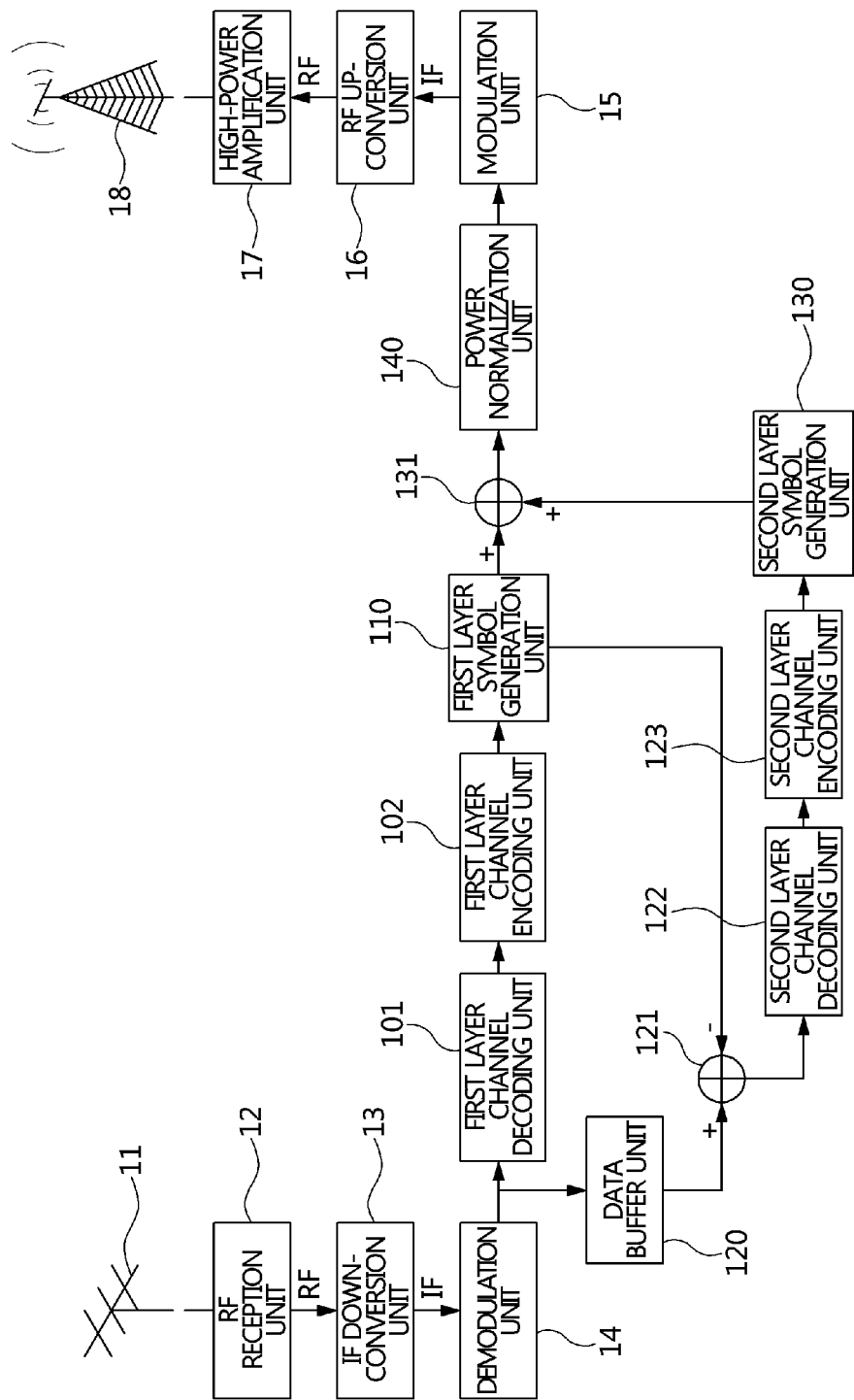
FIG. 3 is a block diagram showing an LDM-based broadcast relay station in which a power normalization unit is included according to an embodiment of the present invention.

FIG. 3 is a block diagram showing a Layered Division Multiplexing (LDM)-based broadcast relay station in which a power normalization unit is included according to an embodiment of the present invention.

Referring to FIG. 3, the LDM-based broadcast relay station in which the power normalization unit is included according to the embodiment of the present invention includes a receiving antenna 11, an RF reception unit 12, an IF down-conversion unit 13, a demodulation unit 14, a modulation unit 15, an RF up-conversion unit 16, a high-power amplification unit 17, a transmitting antenna 18, a first layer channel decoding unit 101, a first layer channel encoding unit 102, a first layer symbol generation unit 110, a data buffer unit 120, a subtractor 121, a second layer channel decoding unit 122, a second layer channel encoding unit 123, a second layer symbol generation unit 130, an adder 131, and a power normalization unit 140.

The receiving antenna 11 and the RF reception unit 12 may select the channel of an RF signal transmitted from a main transmitter and receive the RF signal through the selected channel.

The IF down-conversion unit 13 may convert the received RF signal into an IF signal.

The demodulation unit 14 may demodulate the IF signal into a baseband signal.

The first layer channel decoding unit 101 may output a signal in which only a first layer is channel-decoded by applying LDM to the baseband signal.

The first layer channel encoding unit 102 may output a signal in which only the first layer is channel-encoded by applying LDM to the signal in which only the first layer is channel-decoded.

The first layer symbol generation unit 110 may output a first layer broadcast signal based on the signal in which only the first layer is channel-encoded.

That is, the first layer symbol generation unit 110 may generate and output a first layer symbol based on the signal obtained by independently applying channel decoding and channel encoding only to the first layer of the received LDM broadcast signal.

Here, the first layer broadcast signal may have the form of a symbol unit.

The data buffer unit 120 may store the received LDM broadcast signal for a delay time before the first layer broadcast signal is output.

The subtractor 121 may eliminate the first layer broadcast signal from the stored LDM broadcast signal based on the symbol synchronization of the first layer broadcast signal.

The second layer channel decoding unit 122 may output a signal in which only a second layer is channel-decoded by applying LDM to the signal resulting from elimination of the first layer broadcast signal from the stored LDM broadcast signal.

The second layer channel encoding unit 123 may output a signal in which only a second layer is channel-encoded by applying LDM to the signal in which only the second layer is channel-decoded.

The second layer symbol generation unit 130 may output a second layer broadcast signal from the signal in which only the second layer is channel-encoded.

That is, the second layer symbol generation unit 130 may generate and output a second layer symbol based on the signal obtained by independently applying channel decoding and channel encoding only to the signal (the second layer) resulting from elimination of the first layer broadcast signal from the stored LDM broadcast signal.

Here, the second layer broadcast signal may have the form of a symbol unit.

In this case, different power values may be injected into the first layer broadcast signal and the second layer broadcast signal, and the power-injected first and second layer broadcast signals may be output.

The adder 131 may combine the first layer broadcast signal with the second layer broadcast signal.

The power normalization unit 140 may normalize the different power values so as to combine the first layer broadcast signal with the second layer broadcast signal.

Here, the power normalization unit 140 may determine power injection levels based on the received LDM broadcast signal so as to normalize the different power values.

The power normalization unit 140 may output an LDM broadcast relay signal by normalizing the different power values. The LDM broadcast relay signal may be a signal obtained by injecting different power values into the first layer broadcast signal and the second layer broadcast signal, independently separating the power-injected first and second layer broadcast signals, and combining the power-injected first and second layer broadcast signals.

The modulation unit 15 may convert the LDM broadcast relay signal into an IF signal.

The RF up-conversion unit 16 may convert the IF signal into an RF signal.

The high-power amplification unit 17 may amplify the RF signal.

The transmitting antenna 18 may transmit the amplified RF signal to the receiver.

The LDM broadcast relay signal, output in this way, may guarantee quality equal to or better than that of a conventional broadcast relay signal.

Figure 4:
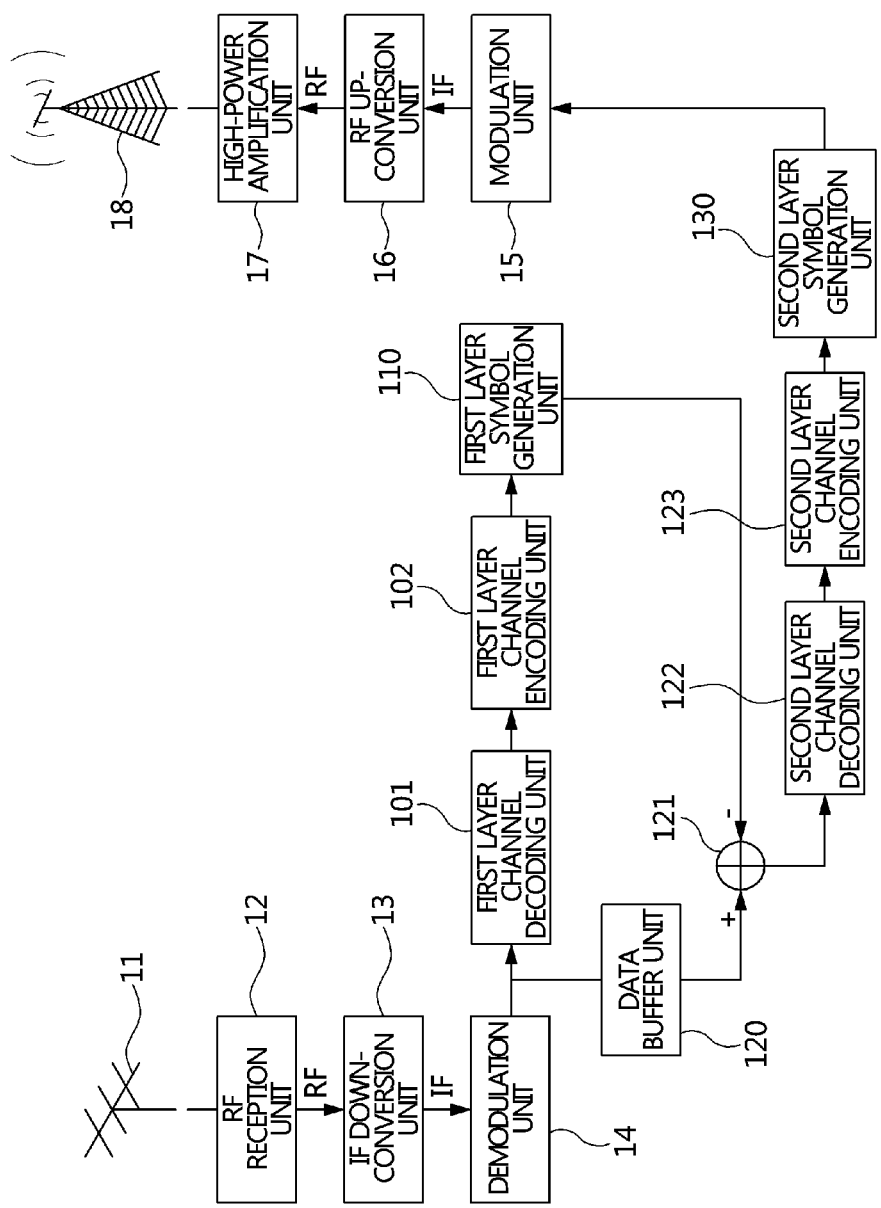
FIG. 4 is a block diagram showing an LDM-based broadcast relay station from which a power normalization unit is excluded according to an embodiment of the present invention.

FIG. 4 is a block diagram showing an LDM-based broadcast relay station from which a power normalization unit is excluded according to an embodiment of the present invention.

Referring to FIG. 4, the LDM-based broadcast relay station from which a power normalization unit is excluded according to the embodiment of the present invention includes a receiving antenna 11, an RF reception unit 12, an IF down-conversion unit 13, a demodulation unit 14, a modulation unit 15, an RF up-conversion unit 16, a high-power amplification unit 17, a transmitting antenna 18, a first layer channel decoding unit 101, a first layer channel encoding unit 102, a first layer symbol generation unit 110, a data buffer unit 120, a subtractor 121, a second layer channel decoding unit 122, a second layer channel encoding unit 123, and a second layer symbol generation unit 130.

The receiving antenna 11 and the RF reception unit 12 may select the channel of an RF signal, transmitted from a main transmitter, and may receive the RF signal through the selected channel.

The IF down-conversion unit 13 may convert the received RF signal into an Intermediate Frequency (IF) signal.

The demodulation unit 14 may demodulate the IF signal into a baseband signal.

The first layer channel decoding unit 101 may output a signal in which only a first layer is channel-decoded by applying LDM to the baseband signal.

The first layer channel encoding unit 102 may output a signal in which only the first layer is channel-encoded by applying LDM to the signal in which only the first layer is channel-decoded.

The first layer symbol generation unit 110 may output a first layer broadcast signal based on the signal in which only the first layer is channel-encoded.

That is, the first layer symbol generation unit 110 may generate and output a first layer symbol based on the signal obtained by independently applying channel decoding and channel encoding only to the first layer of the received LDM broadcast signal.

Here, the first layer broadcast signal may have the form of a symbol unit.

The data buffer unit 120 may store the received LDM broadcast signal for a delay time before the first layer broadcast signal is output.

The subtractor 121 may eliminate the first layer broadcast signal from the stored LDM broadcast signal based on the symbol synchronization of the first layer broadcast signal.

The second layer channel decoding unit 122 may output a signal in which only a second layer is channel-decoded by applying LDM to the signal resulting from elimination of the first layer broadcast signal from the stored LDM broadcast signal.

The second layer channel encoding unit 123 may output a signal in which only a second layer is channel-encoded by applying LDM to the signal in which only the second layer is channel-decoded.

The second layer symbol generation unit 130 may output a second layer broadcast signal from the signal in which only the second layer is channel-encoded.

That is, the second layer symbol generation unit 130 may generate and output a second layer symbol based on the signal obtained by independently applying channel decoding and channel encoding only to the signal (the second layer) resulting from elimination of the first layer broadcast signal from the stored LDM broadcast signal.

The second layer broadcast signal may have the form of a symbol unit.

In this case, different power values may be injected into the first layer broadcast signal and the second layer broadcast signal and then the power-injected first and second layer broadcast signals may be output.

The modulation unit 15 may convert the second layer broadcast signal into an IF signal.

The RF up-conversion unit 16 may convert the IF signal into an RF signal.

The high-power amplification unit 17 may amplify the RF signal.

The transmitting antenna 18 may transmit the amplified RF signal to the receiver.

The second layer broadcast signal, output in this way, may guarantee quality equal to or better than that of a conventional broadcast relay signal, and the configuration of the relay station may be simplified owing to the exclusion of the power normalization unit.

Figure 5:
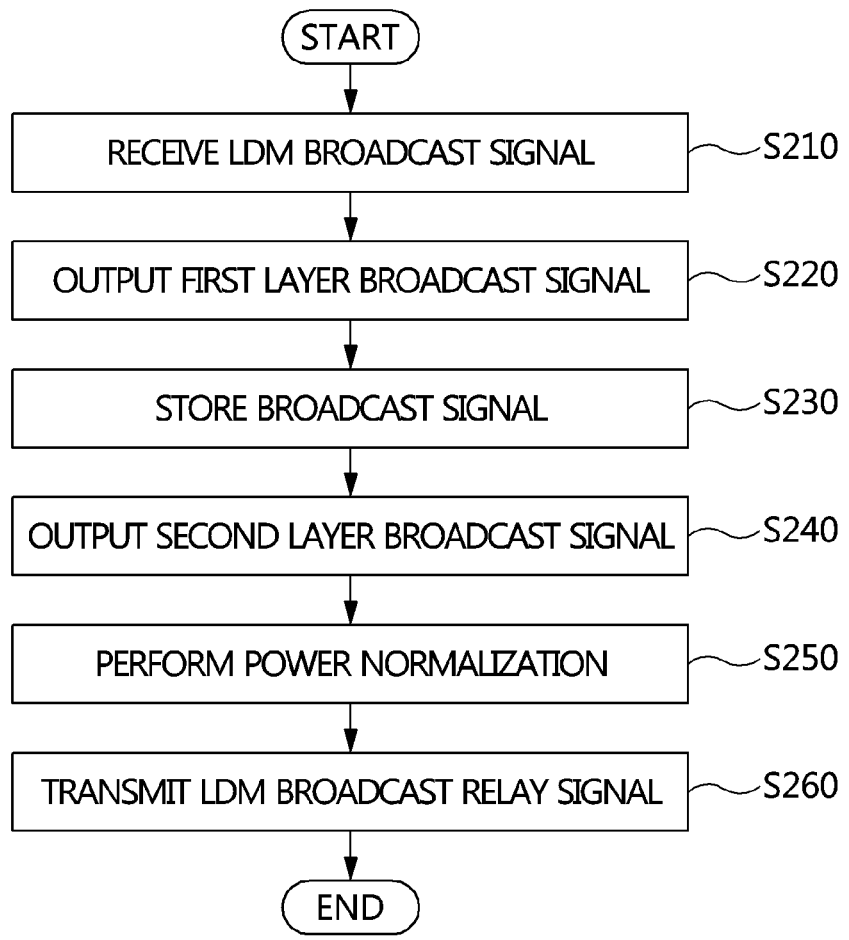
FIG. 5 is an operation flowchart showing an LDM-based broadcast relay method according to an embodiment of the present invention.

FIG. 5 is an operation flowchart showing an LDM-based broadcast relay method according to an embodiment of the present invention.

Referring to FIG. 5, the LDM-based broadcast relay method according to the embodiment of the present invention first receives an LDM broadcast signal at step S210.

More specifically, at step S210, the channel of an RF signal transmitted from a main transmitter may be selected, and the RF signal may be received through the selected channel.

At step S210, the received RF signal may be converted into an IF signal.

Further, at step S210, the IF signal may be demodulated into a baseband signal.

Next, the LDM-based broadcast relay method may output a first layer broadcast signal at step S220.

That is, at step S220, a signal in which only a first layer is channel-decoded may be output by applying LDM to the baseband signal.

Further, at step S220, a signal in which only the first layer is channel-encoded may be output by applying LDM to the signal in which only the first layer is channel-decoded.

At step S220, the first layer broadcast signal may be output based on the signal in which only the first layer is channel-encoded.

That is, at step S220, a first layer symbol may be generated and output based on the signal obtained by independently applying channel decoding and channel encoding only to the first layer of the received LDM broadcast signal.

The first layer broadcast signal may have the form of a symbol unit.

Further, the LDM-based broadcast relay method may store the LDM broadcast signal at step S230.

More specifically, at step S230, the received LDM broadcast signal may be stored for a delay time before the first layer broadcast signal is output.

Then, the LDM-based broadcast relay method may output a second layer broadcast signal at step S240.

That is, at step S240, the first layer broadcast signal may be eliminated from the stored LDM broadcast signal based on symbol synchronization of the first layer broadcast signal.

In this regard, at step S240, a signal in which only a second layer is channel-decoded may be output by applying LDM to the signal resulting from elimination of the first layer broadcast signal from the stored LDM broadcast signal.

Further, at step S240, a signal in which only the second layer is channel-encoded may be output by applying LDM to the signal in which only the second layer is channel-decoded.

Here, at step S240, a second layer broadcast signal may be output from the signal in which only the second layer is channel-encoded.

That is, at step S240, a second layer symbol may be generated and output based on the signal obtained by independently applying channel decoding and channel encoding only to the signal (the second layer) resulting from elimination of the first layer broadcast signal from the stored LDM broadcast signal.

The second layer broadcast signal may have the form of a symbol unit.

Here, different power values may be injected into the first layer broadcast signal and the second layer broadcast signal and then the power-injected first and second layer broadcast signals may be output.

The LDM-based broadcast relay method may perform power normalization at step S250.

That is, at step S250, the first layer broadcast signal may be combined with the second layer broadcast signal.

At step S250, the different power values may be normalized so as to combine the first layer broadcast signal with the second layer broadcast signal.

Here, at step S250, power injection levels may be determined based on the received LDM broadcast signal so as to normalize the different power values.

In this regard, at step S250, an LDM broadcast relay signal may be output by normalizing the different power values. The LDM broadcast relay signal may be a signal obtained by injecting different power values into the first layer broadcast signal and the second layer broadcast signal, independently separating the power-injected first and second layer broadcast signals, and combining the power-injected first and second layer broadcast signals.

Step S250 may be omitted, wherein the output LDM broadcast relay signal may be the second layer broadcast signal.

Further, the LDM-based broadcast relay method may transmit the LDM broadcast relay signal at step S260.

That is, at step S260, the LDM broadcast relay signal may be converted into an IF signal.

At step S260, the IF signal may be converted into an RF signal.

Also, at step S260, the RF signal may be amplified.

Further, at step S260, the amplified RF signal may be transmitted to a receiver.

The LDM broadcast relay signal, output in this way, may guarantee quality equal to or better than that of a conventional broadcast relay signal.

Figure 6:
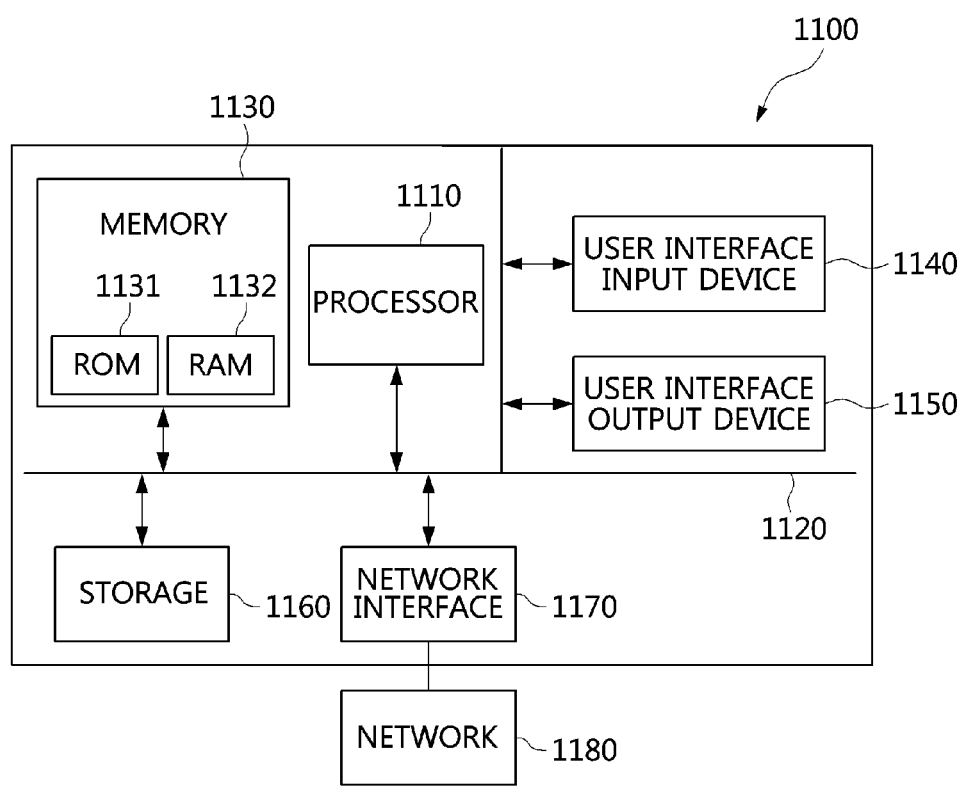
FIG. 6 is a block diagram showing a computer system according to an embodiment of the present invention.

FIG. 6 is a block diagram showing a computer system according to an embodiment of the present invention.

Referring to FIG. 6, the embodiment of the present invention may be implemented in a computer system 1100 such as a computer-readable storage medium. As shown in FIG. 6, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be either a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory may include Read Only Memory (ROM) 1131 or Random Access Memory (RAM) 1132.

As described above, the present invention may independently separate a Layered Division Multiplexed (LDM) broadcast signal into respective layers and relay the separated broadcast signals.

Further, the present invention may regenerate LDM broadcast signals, which are separated into respective layers, in the form of symbols through channel decoding and channel encoding, thus improving the quality of output signals.

Furthermore, the present invention may provide the structure of a simplified relay by relaying an LDM broadcast signal in a single layer that is independently separated.

As described above, in the LDM-based broadcast relay apparatus and method according to the present invention, the configurations and schemes in the above-described embodiments are not limitedly applied, and some or all of the above embodiments can be selectively combined and configured so that various modifications are possible.

What is claimed is:

1. A Layered Division Multiplexing (LDM)-based broadcast relay apparatus, comprising:
   a memory; and
   one or more hardware processors to execute an operation including:
      receiving a Layered Division Multiplexed (LDM) broadcast signal including a first layer broadcast signal and a second layer broadcast signal,
      outputting the first layer broadcast signal based on the received LDM broadcast signal,
      storing the received LDM broadcast signal in the memory for a delay time,
      eliminating the output first layer broadcast signal from the stored LDM broadcast signal to output the second layer broadcast signal, and
      transmitting the output second layer broadcast signal that results from the eliminating of the output first layer broadcast signal from the stored LDM broadcast signal.

2. The LDM-based broadcast relay apparatus of claim 1, wherein each of the first layer broadcast signal and the second layer broadcast signal has a form of a symbol unit.

3. The LDM-based broadcast relay apparatus of claim 2, wherein the outputting of the first layer broadcast signal and the outputting of the second layer broadcast signal occur after different power values have been injected into the first layer broadcast signal and the second layer broadcast signal.

4. The LDM-based broadcast relay apparatus of claim 3, wherein the output first layer broadcast signal is eliminated from the stored LDM broadcast signal based on symbol synchronization of the first layer broadcast signal.

5. A Layered Division Multiplexing (LDM)-based broadcast relay method using an LDM-based broadcast relay apparatus, comprising:
   receiving a Layered Division Multiplexed (LDM) broadcast signal including a first layer broadcast signal and a second layer broadcast signal;
   outputting the first layer broadcast signal based on the received LDM broadcast signal;
   storing the received LDM broadcast signal in a memory for a delay time;
   eliminating the output first layer broadcast signal from the stored LDM broadcast signal to output the second layer broadcast signal; and
   transmitting the output second layer broadcast signal that results from the eliminating of the first layer broadcast signal from the stored LDM broadcast signal.

6. The LDM-based broadcast relay method of claim 5, wherein each of the first layer broadcast signal and the second layer broadcast signal has a form of a symbol unit.

7. The LDM-based broadcast relay method of claim 6, wherein the outputting of the first layer broadcast signal and the outputting of the second layer broadcast signal occur after different power values have been injected into the first layer broadcast signal and the second layer broadcast signal, respectively.

8. The LDM-based broadcast relay method of claim 7, wherein outputting the second layer broadcast signal is configured to eliminate the first layer broadcast signal from the stored LDM broadcast signal based on symbol synchronization of the first layer broadcast signal.

* * * * *